Nov. 24, 1936.   W. T. WELLS   2,061,862
CABLE CONSTRUCTION
Filed Dec. 20, 1932

INVENTOR
Walter T. Wells

Patented Nov. 24, 1936

2,061,862

UNITED STATES PATENT OFFICE 2,061,862

CABLE CONSTRUCTION

Walter T. Wells, Glendale, Calif., assignor to The Technicraft Engineering Corporation, Los Angeles, Calif., a corporation of California Application December 20, 1932, Serial No. 648,037

1 Claim. (Cl. 173—266)

The present invention is an improved cable construction and relates more particularly to a type of cable designed to carry an electrical conductor, imbedded within an insulative covering, to great depths, as, for instance, in deep wells.

When put to such use, a cable is subjected to several severe tests, unusual to ordinary uses for which cables are made.

In most conventional uses, a cable is often placed under heavy strain throughout relatively short intervals of its length but is seldom, if ever, placed under a strain where it must support, while suspended from one end, several thousand feet of its own length, and in addition a heavy tool attached thereto.

The structure hereinafter described is designed primarily to meet this and other unusual conditions which are encountered in oil well operations, where twisted strands of wire on the outer surface of the cable exert a constrictional force on the inner laminae, such as waterproofing, insulation and the like, and where such force is greatly augmented by hydrostatic pressure in a well or casing.

It is a well known fact that any suspended member, even tubing and drill pipe, stretches very materially from end to end when lowered to great depths in a well.

The torsional pressure of the outer strands of cable becomes so great under these conditions that peripheral friction between the enclosed laminae prevents each layer of material from moving longitudinally to compensate for the stretch.

The primary object of my invention is to provide a means for protecting the fabricated members inside the cable from external pressure, whereby each lamination will be free to elongate, proportionately to the other members, and to accommodate itself to great tension and to relative movement of adjacent members in passing over sheaves and reels.

Another object is the provision of a novel method of embedding the electrical conductor element of the cable whereby said conductor can, under all conditions, be stretched as much or more than the other cable members.

It is obvious that, should the conductor be severed, the entire cable becomes worthless for the purpose for which it is intended. If either the conductor or its protective covering is parted, both being embedded beneath the outer strands of the cable, there is no way of locating the injury and the entire cable is worthless.

Figure 1:
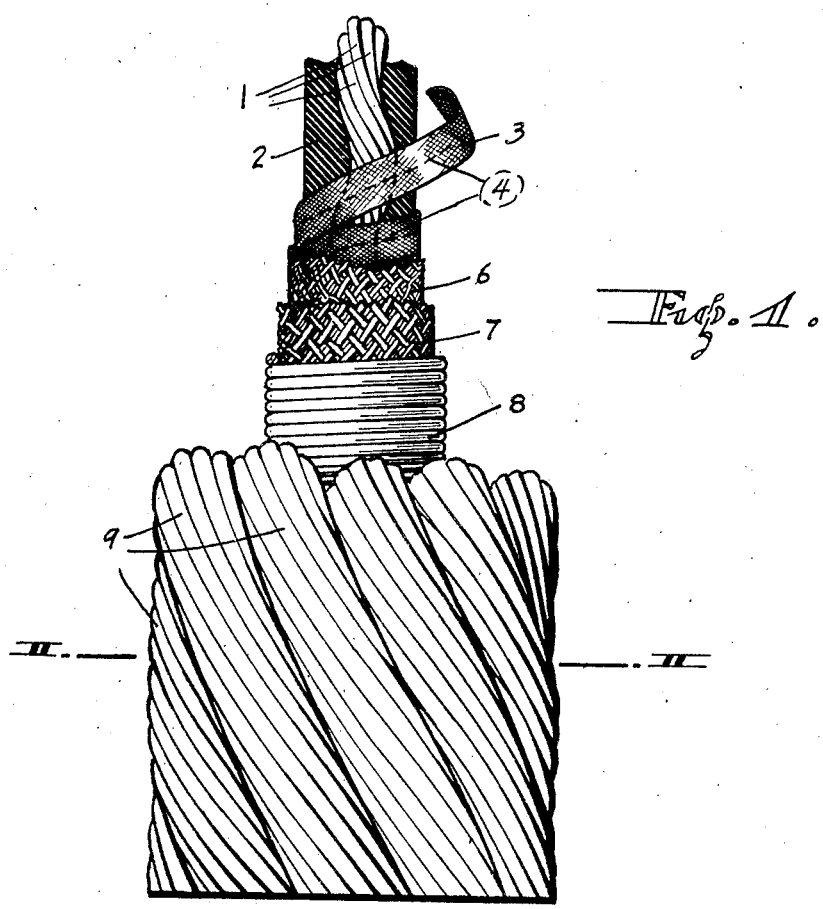
Figure 2:
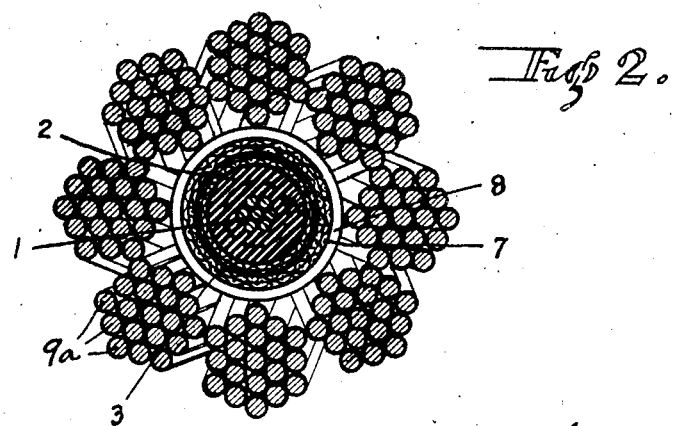

In the accompanying drawing Figure 1 is a side elevation of a fragment of my improved cable, wherein the component parts are successively broken away for the purpose of better illustration, and the insulative member shown in longitudinal central cross section, and Figure 2 is a transverse section of Figure 1 taken on the line II—II of said figure.

Referring to the drawing the numeral 1 indicates the strands of an electric conductor, here shown as seven in number.

Said strands are twisted in the usual manner, and the twisted cable so formed is subsequently treated, as in forming rolls to re-form it to shorten its normal length so that it can be stretched longitudinally, when embedded in an insulative material 2 of rubber or suitable resilient material.

In the preferred form shown in the drawing, said cable is helically wound through the insulation 2 as indicated in full lines Figure 1, and dotted lines in Figure 2.

This convolute form similar to a very small coil spring affords a maximum degree of stretch and is easily produced by conventional means. Obviously the stranded conductor or insulated cable can be kinked, crimped, waved or otherwise distorted to accomplish the desired result.

The insulative member 2, of rubber or other elastic insulating compound, with the conductor 1 embedded therein, is wrapped helically with varnished cambric 3 the strip being overlapped upon itself one half its width as indicated by the dotted line 4, Figure 1.

When so wrapped the cable is covered by a woven tubular fabric 6, over which is applied another similarly woven tube 7.

The structure so built up is then armored by a helical wire coil 8, which is formed on the braided insulation and so wound that each coil normally contacts the adjacent coils.

This armor flexes readily as the cable is reeved through sheaves and wound and unwound on a reel and protects the laminae it encloses from constriction by outside strands 9 of the finished cable.

Each of said strands is composed of nineteen (19) substrands 9—a.

The helical armor 8, flexible in all directions, provides a metal-to-metal contact with strands 9, and the coils of said armor cross said strands in substantially perpendicular relation thereto, constituting a flexible conduit.

When strands 9 are under end-to-end stress, the constricting force of said strands, as they seek to straighten, is applied at equidistant points on the periphery of armor 8.

Being circular in form, said armor resists compression and protects the inner laminations from external pressure.

I claim:—

A hoisting and haulage cable comprising a multi-stranded spirally wound and coiled conductor, a layer of yieldable insulating material surrounding the same, a tubular woven fabric covering for the insulating material, a helically wound armor surrounding the fabric, and a stranded wire weight supporting sheath surrounding the armor and spirally wound in the same direction as the conductor, said weight supporting sheath occupying at least one-half the total diameter of the completed cable.

WALTER T. WELLS.